US012584723B2

(12) United States Patent
 Åkerblom

(10) Patent No.: US 12,584,723 B2
(45) Date of Patent: Mar. 24, 2026

(54) BEATING GAP SENSOR DEVICE FOR A REFINER APPARATUS AND CALIBRATION METHOD

(71) Applicant: Daprox AB, Kungens Kurva (SE)

(72) Inventor: Bengt Åkerblom, Vårby (SE)

(73) Assignee: DAPROX AB, Kungens Kurva (SE)

( * ) Notice: Subject to any disclaimer, the term of this patent is extended or adjusted under 35 U.S.C. 154(b) by 164 days.

(21) Appl. No.: 18/041,454

(22) PCT Filed: Aug. 16, 2021

(86) PCT No.: PCT/SE2021/050793
§ 371 (c)(1),
(2) Date: Feb. 13, 2023

(87) PCT Pub. No.: WO2022/045942
PCT Pub. Date: Mar. 3, 2022

(65) Prior Publication Data
US 2023/0296366 A1 Sep. 21, 2023

(30) Foreign Application Priority Data

Aug. 26, 2020 (SE) .................................... 2050978-2

(51) Int. Cl.
G01B 7/00 (2006.01)
G01D 5/20 (2006.01)
(52) U.S. Cl.
CPC ........... G01B 7/003 (2013.01); G01D 5/2006 (2013.01)
(58) Field of Classification Search
CPC .............................. G01B 7/003; G01D 5/2006
See application file for complete search history.

(56) References Cited

U.S. PATENT DOCUMENTS

| | | | |
|---|---|---|---|
| 4,198,006 A * | 4/1980 | Rolfe | ...................... B02C 18/16 |
| | | | 324/207.16 |
| 4,229,696 A | 10/1980 | Gustafson | |

(Continued)

FOREIGN PATENT DOCUMENTS

| | | |
|---|---|---|
| CN | 101563585 A | 10/2009 |
| CN | 103105120 A | 5/2013 |

(Continued)

OTHER PUBLICATIONS

International Search Report for PCT/SE2021/050793 dated Sep. 17, 2021.

(Continued)

*Primary Examiner* — Reena Aurora
(74) *Attorney, Agent, or Firm* — Knobbe Martens Olson & Bear LLP

(57) ABSTRACT

The present invention concerns a sensor device (1) comprising a transducer (3) adapted to generate a magnetic field (MF), the sensor device (1) is configured to measure a beating gap (G) between a first (5) and a second (7) refining disc of a refiner apparatus (9) and is configured to be mounted in the first refining disc (5), the sensor device (1) comprises a magnetic pole (13), a coil assembly (15) and a measuring head (11'), which measuring head (11') is configured to be set in calibration position relative to the second refining disc (7) for calibration of the sensor device (1). The measuring head (11') comprises an outer end (10') made of a non-magnetic material configured to be positioned in abutment with the second refining disc (7) in a calibration sequence. The present invention also concerns a method of calibration of said sensor device (1).

13 Claims, 4 Drawing Sheets

(56) References Cited

U.S. PATENT DOCUMENTS

| | | | | |
|---|---|---|---|---|
| 4,454,991 | A * | 6/1984 | Brenholdt | D21D 1/30 |
| | | | | 241/259.2 |
| 4,673,875 | A * | 6/1987 | Kjellqvist | B02C 7/14 |
| | | | | 340/870.31 |
| 4,804,912 | A | 2/1989 | Lysén | |
| 4,950,986 | A | 8/1990 | Guerrero | |
| 5,691,636 | A | 11/1997 | Allshouse et al. | |
| 7,064,536 | B2 * | 6/2006 | Akerblom | D21D 1/30 |
| | | | | 324/207.15 |
| 2002/0158628 | A1 | 10/2002 | Akerblom | |
| 2004/0169506 | A1 | 9/2004 | Akerblom et al. | |
| 2009/0001965 | A1 | 1/2009 | Ausserlechner et al. | |

FOREIGN PATENT DOCUMENTS

| | | | |
|---|---|---|---|
| EP | 0640395 | A1 | 3/1995 |
| EP | 1615722 | A1 | 1/2006 |
| SE | 401896 | B | 6/1978 |
| WO | WO 03/027607 | A1 | 4/2003 |
| WO | WO 2004/085070 | A1 | 10/2004 |

OTHER PUBLICATIONS

Extended European Search Report dated Jun. 20, 2024, corresponding EP application No. 21862188.6.
Office Action and Search Report issued in Chinese Application No. 202180051250.6, dated Aug. 9, 2025.
Supplementary Search Report issued in Chinese Application No. 202180051250.6, dated Aug. 7, 2025.

* cited by examiner

1001 — START

1002 — PERFORM METHOD

1003 — STOP

2001 — START

2002 — MEASURE VARIATION OF MAGNETIC FIELD

2003 — CONVERT VARIATION OF MEGNETIC FIELD TO ELECTRIC SIGNALS

2004 — DETECT ABUTMENT OF MEASURING HEAD

2005 — BRING MEASURING HEAD INTO ABUTMENT

2006 — MOVE AT LEAST FIRST REFINING DISC

2007 — STOP

CONTROL CIRCUITRY

MEMORY 660

PROCE-SSING UNIT 610

BUS 614

MEMORY 650
P

BUS 611
P

NON-VOLATILE MEMORY
MEMORY UNIT 630
MEMORY UNIT 640
620

BUS 615

BUS 612

PORT 999

9

130

BEATING GAP SENSOR DEVICE FOR A REFINER APPARATUS AND CALIBRATION METHOD

CROSS REFERENCE TO RELATED APPLICATIONS

This application is a U.S. National Phase Application of PCT International Application Number PCT/SE2021/050793, filed on Aug. 16, 2021, designating the United States of America and published in the English language, which is an International Application of and claims the benefit of priority to Swedish Patent Application No. 2050978-2, filed on Aug. 26, 2020. The disclosures of the above-referenced applications are hereby expressly incorporated by reference in their entireties.

TECHNICAL FIELD

The present invention relates to a sensor device according to claim 1 and to a method of calibration of the sensor device according to claim 8.

The present invention further may relate to a refiner apparatus and data medium storing program adapted for calibration of a beating gap sensor device of the refiner apparatus.

The present invention primary concerns the paper pulp producing industry making use of refiner apparatuses. The present invention also concerns the industry producing beating gap sensors configured to measure the beating gap between the grinding surfaces of the refining disc of the refiner apparatus.

BACKGROUND

Current sensor devices for distance measurement between refining discs comprises transducers of magnetic type, preferably working according to the reluctance principle, which transducers comprise a magnetic pole encompassed in a sleeve forming a measuring head.

Current sensor devices may be configured to be brought into contact with opposing grinding surface during calibration and known methods are provided for achieving precise calibration of the sensor device.

One example of a beating gap sensor is shown in U.S. Pat. No. 6,657,427 B2 to the applicant. The sensor is mounted displaceable in axial direction of the first refiner disc and can be brought into contact with the opposing second refiner disc. The sensor in U.S. Pat. No. 6,657,427 B2 works well, but is subject to development.

SUMMARY OF THE INVENTION

There is an object to increase precision in determining the size of the beating gap in refiner for paper pulp production, in which wear and tear of the measuring head otherwise constitutes a problem for the measuring precision.

There is an object to provide a sensor device configured for accurate calibration.

There is an object to provide a sensor device that functions in a rigid way and which provides cost-efficient functionality.

Abutment may occur in other places of the opposing refiner discs than at the position of the prior art sensor measuring head, positioned for prior art calibration, which abutment between refiner disc segments or bars may mislead the system for correct calibration.

This or at least one of said objects has been achieved by a sensor device comprising a transducer adapted to generate a magnetic field, the sensor device is configured to measure a beating gap between a first and a second refining disc of a refiner apparatus and is configured to be mounted in the first refining disc, the sensor device comprises a magnetic pole, a coil assembly and a measuring head, which measuring head is configured to be set in calibration position relative to the second refining disc for calibration of the sensor device, wherein the measuring head comprises an outer end made of a non-magnetic material configured to be positioned in abutment with the second refining disc in a calibration sequence.

Alternatively, the coil assembly is arranged around the magnetic pole.

Alternatively, a first grinding surface of the first refining disc faces a second grinding surface of the second refining disc.

Alternatively, the beating gap is defined between the first grinding surface of the first refining disc and the second grinding surface of the second refining disc.

Alternatively, said magnetic field is generated around the magnetic pole.

Alternatively, the non-magnetic material is configured to abut the second grinding surface of the second refining disc for said calibration sequence.

Alternatively, said calibration sequence is made during rotation of the second refining disc and/or rotation of the first refining disc.

In such way is achieved time saving and cost-effective operation of the refiner apparatus.

Alternatively, a non-magnetic outer end surface of the outer end of the measuring head is configured to face the grinding surface of the second refining disc during use of the sensor device.

Alternatively, the measuring head constitutes a portion of a sleeve arrangement in which the magnetic pole is accommodated, the sleeve arrangement comprises the outer end comprising the non-magnetic material configured to abut the second refining disc.

Alternatively, the magnetic pole is mounted in the sleeve arrangement and a coil assembly is arranged around the magnetic pole.

Alternatively, the outer end of the sleeve arrangement may be called non-magnetic sleeve end.

Alternatively, the sleeve arrangement comprises magnetic material, apart from the non-magnetic sleeve end comprising the non-magnetic material.

Alternatively, the non-magnetic sleeve end protrudes from the first grinding surface with a protrusion measurement, when the sensor device has been mounted to the first refining disc.

Alternatively, the magnetic pole and/or sleeve arrangement and/or non-magnetic sleeve end comprises stainless steel.

Alternatively, the sensor device is an inductive proximity sensor.

Alternatively, the sensor device is coupled to a gap measurement converting circuitry, configured to convert variation of the magnetic field to electrical signals depending upon variation of the beating gap between the measuring head and the second refining disc.

Alternatively, the outer pole end of the magnetic pole free from non-magnetic material forms a pole end surface facing the second grinding surface.

Alternatively, the non-magnetic sleeve end forms a sleeve end surface facing the second grinding surface.

Alternatively, the first and second refining disc are configured to be moved toward each other for varying the beating gap.

Alternatively, the first and second refining disc are arranged on a rotary axis, which is oriented normal to the first and second grinding surface.

Alternatively, at least the first refining disc is configured to be moved toward the second refining disc.

Alternatively, the gap measurement converting circuitry is coupled to a refining disc driver configured to move at least the first refining disc along the rotary axis toward and/or from the second refining disc for adjusting the beating gap.

Alternatively, the gap measurement converting circuitry is coupled to a refining disc position sensor for registration of the mutual position of the respective first and second refining disc.

Alternatively, the gap measurement converting circuitry is coupled to a control circuitry configured to control the refining disc driver to move at least the first refining disc along the rotary axis.

Alternatively, the measuring head positioned in abutment with the second refining disc provides a first distance value between the first and second grinding surface, which first distance value is registered by the measurement converting circuitry.

Alternatively, the first distance value is known as the distance that the non-magnetic sleeve end protrudes in a direction from and transverse to the first grinding surface, e.g. 0,5 mm, or any other suitable value.

Alternatively, the outer pole end of the magnetic pole is configured flush with the first grinding surface.

Alternatively, the outer pole end of the magnetic pole is positioned inside or outside the first grinding surface.

Alternatively, the control circuitry is configured to control the refining disc driver to provide a movement of least the first refining disc along the rotary axis in accordance with a second distance value for reaching an efficient beating gap value, e.g. 5 mm (in case the first distance value is 0, 5 mm, the second distance value is 4,5 mm for reaching an efficient beating gap value of 5 mm).

Alternatively, the gap measurement converting circuitry is configured to convert a first magnetic field value to a first electrical signal, which first magnetic field value correlates to the first distance value.

Alternatively, the gap measurement converting circuitry is configured to convert a second magnetic field value to a second electrical signal, which second magnetic field value correlates to the second distance value.

Alternatively, the gap measurement converting circuitry is configured to, when the beating gap undergoes change (e.g. due to wear of the grinding surface) into a third distance value different from the efficient beating gap value, register and convert the variation of the magnetic field of a third magnetic field value in compliance with said third distance value.

Alternatively, the gap measurement converting circuitry is configured to convert the third magnetic field value to a third electrical signal, which third magnetic field value correlates to the third distance value.

Alternatively, the gap measurement converting circuitry is configured to command the control circuitry to activate the refining disc driver to move the first and/or second refining disc toward each other for adjusting the third distance value to reach the efficient beating gap value, i.e. adjusting the beating gap to the second distance value, which is efficient for optimal grinding.

Alternatively, when the sleeve end surface of the measuring head abuts the second grinding surface, the gap measurement converting circuitry register the abutment and calibrate the sensor device.

In such way is achieved that calibrating of the sensor device can be made in a reliable way at the same time as vital magnetic material of the magnetic pole and the sleeve arrangement not being weared out, but saved for efficient functionality of the sensor device.

That is, for rigid and cost-efficient functionality of the sensor device, the magnetic material is vital for achieving correct and robust beating gap measurement between the first and second grinding surface.

Alternatively, the coil assembly is applied around the magnetic pole and is coupled to an AC supply unit adapted for inducing an electric current into the coil assembly for generating the magnetic field.

Alternatively, a measuring head abutment detecting circuitry of the sensor device is configured to detect abutment of the measuring head abutting the second refining disc, when moving the first and the second refining disc toward each other.

Alternatively, the measuring head abutment detecting circuitry is configured to detect mechanical vibrations and/or acoustic energy changes and/or temperature changes and/or current alternation of said induced electric current, related to said abutment.

Alternatively, the first and second refining disc rotate in opposite directions (about the rotary axis) for providing a beating effect between the first and second grinding surface and providing mechanical grinding of cellulose fibres for manufacture of paper pulp.

Alternatively, the first refining disc is stationary and the second refining disc rotates about the rotary axis for providing a beating effect between the first and second grinding surface and providing mechanical grinding of cellulose fibres for manufacture of paper pulp.

This or at least one of said objects has been achieved by a method of calibration of a sensor device comprising a transducer adapted to generate a magnetic field, the sensor device is configured to measure a beating gap between a first and a second refining disc of a refiner apparatus and is configured to be mounted in the first refining disc, the sensor device comprises a magnetic pole, a coil assembly and a measuring head, which measuring head is configured to be set in calibration position relative to the second refining disc for calibration of the sensor device, wherein the measuring head comprises an outer end made of a non-magnetic material configured to be positioned in abutment with the second refining disc in a calibration sequence, the method comprises the steps of: starting the calibration sequence; inducing an electric current into the coil assembly for generating the magnetic field around the magnetic pole; rotating the first and/or the second refiner disc about a rotary axis and moving them axially toward each other; and bringing the measuring head into abutment with the second refining disc for calibrating the sensor device.

Alternatively, the step of bringing the measuring head into abutment with the second refining disc for calibrating the sensor device may be performed by bringing the measuring head into abutment with the second grinding surface for calibrating the sensor device.

Alternatively, the method comprises the further steps of: measuring the variation of the magnetic field around the magnetic pole generated by the transducer; converting the variation of the magnetic field to electric signals depended upon variation of the distance between the measuring head and the second refining disc.

Alternatively, the step of measuring the variation of the magnetic field around the magnetic pole generated by the transducer may be performed by a gap measurement converting circuitry coupled to the sensor device configured to convert variation of the magnetic field to electrical signals depending upon variation of the gap between the measuring head and the second refining disc (or the second grinding surface).

Alternatively, the method comprises the further steps of: detecting abutment of the measuring head abutting the second refining disc and/or the second grinding surface.

Alternatively, the method step of bringing the measuring head into abutment with the second refining disc for calibrating the sensor device provides a first distance value between the first and second grinding surface, which first distance value is registered by the measurement converting circuitry.

Alternatively, the method comprises the further steps of: moving at least the first refining disc along the rotary axis in accordance with a second distance value for reaching an efficient beating gap value.

In such way is achieved that a first plane of the first grinding surface will be parallel with a second plane of the second grinding surface by wearing down the first and second grinding surfaces (so that a first grinding surface is parallel with the second grinding surface), but still achieving an efficient measurement of the beating gap.

In such way the magnetic pole will not be weared down, but maintains its original length thus providing a reliable magnetic field around the magnetic pole and achieving a correct calibration sequence.

In such way non-correct electrical signals can be avoided, wherein the gap measurement converting circuitry functions in an efficient way as the original length of the magnetic pole is maintained.

Alternatively, the sensor device is configured to be calibrated by moving the magnetic pole axially toward the second grinding surface until the measuring head abuts the second grinding surface of the second refining disc.

Alternatively, the method comprises the steps of providing the sensor device and mounting the sensor device in the refiner apparatus.

Alternatively, the gap measurement converting circuitry is coupled to the measuring head abutment detecting circuitry for providing a calibration value (e.g. zero), i.e. the sensor device being zeroed.

Alternatively, the sensor device comprises, and/or is configured to be coupled to, the gap measurement converting circuitry configured to convert variation of the magnetic field and/or variation of magnetic reluctance and/or variation of current and/or variation of voltage dependent upon variation of the distance between the measuring head and the second grinding surface.

Alternatively, for sensor device calibration, the first and second refiner disc being moved axially toward each other until the first and second grinding surface come into contact with each other, fully or partially, and/or when the measuring head come into contact with the second grinding surface, fully or partially, wherein the sensor device is zeroed.

In such way is achieved that a first plane of the first grinding surface will be parallel with a second plane of the second grinding surface by wearing down a first and second set of grinding segments of respective grinding surface, so that the first grinding surface is parallel with the second grinding surface.

In such way is achieved that the magnetic pole of the sensor device will maintain its full length, providing that the gap measurement converting circuitry converts the electric current related value into a correct beating gap value.

In such way the magnetic pole will not be weared down, but maintains its original length providing a magnetic field around the magnetic pole that is determined from induced electric current into the coil arrangement.

Alternatively, the outer end of the measuring head made of a non-magnetic material is configured to be weared down until the first grinding surface is parallel with the second grinding surface.

Alternatively, the magnetic pole comprises an inner end and an outer end defining the originally length of the magnetic pole.

Alternatively, the inner end faces away from the second refining disc and the outer end faces the second refining disc.

In such way, misleading electrical values are avoided and the gap measurement converting circuitry would work with correct electrical values related to full length of the magnetic pole.

Alternatively, the detecting circuitry is configured to detect mechanical vibrations and/or acoustic energy changes and/or temperature changes and/or current alternation of said induced electric current, related to said abutment.

This or at least one of said objects has been achieved by a refiner apparatus comprising the sensor device according to claim 1, wherein the refiner apparatus further comprises a refining disc driver, a gap measurement converting circuitry and a control circuitry configured to control the refining disc driver to move the first and/or second refining disc along a rotary axis in accordance with a first distance value registered by the measurement converting circuitry and subsequently in accordance with a second distance value.

This or at least one of said objects has been achieved by a data medium storing program adapted for calibration of the sensor device, wherein the data medium storing program comprises a program code stored on a medium, which is readable on a computer, for causing the control circuitry to perform the method steps of: starting the calibration sequence; inducing an electric current into the coil assembly for generating the magnetic field around the magnetic pole; rotating the first and/or the second refiner disc about a rotary axis and moving them axially toward each other; and bringing the measuring head into abutment with the second refining disc for calibrating the sensor device.

This or at least one of said objects has been achieved by a data medium storing program product comprising a program code stored on a medium, which is readable on a computer, for performing the claimed method steps, when said data medium storing program is run on the control circuitry.

BRIEF DESCRIPTION OF THE DRAWINGS

The present invention will now be described by way of examples with references to the accompanying schematic drawings, of which.

DETAILED DESCRIPTION

Hereinafter, exemplary embodiments of the present invention will be described with reference to the accompanying drawings, wherein for the sake of clarity and understanding of the invention some details of no importance may be deleted from the drawings.

Figure 1:
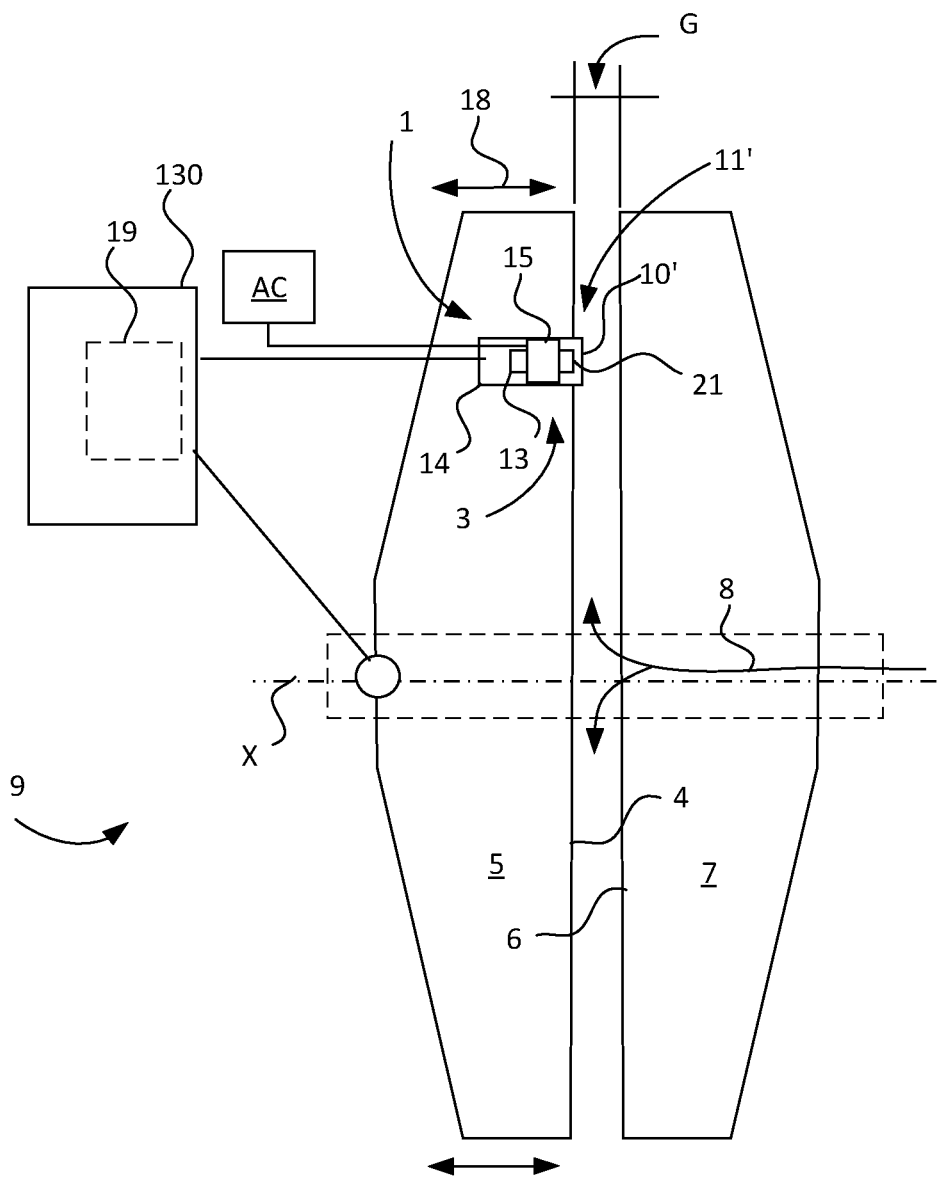
FIG. 1 illustrates a sensor device according to a first example.

FIG. 1 shows a first example of a sensor 1 of magnetic type working according to the reluctance principle. The sensor 1 is mounted in a refiner apparatus 9 provided for paper pulp production. The sensor 1 is configured to measure a beating gap G between a first grinding surface 4 of a first refining disc 5 facing a second grinding surface 6 of a second refining disc 7. The first 5 and second 7 refining disc rotate in opposite directions about a rotary axis X for causing a beating effect between the first 4 and second grinding surface 6 and for providing mechanical grinding of cellulose fibres 8 producing the paper pulp.

The sensor 1 comprises a transducer 3 adapted to generate a magnetic field. The transducer 3 comprises a magnetic pole 13 and a coil assembly 15. The coil assembly 15 is applied around the magnetic pole 13 and is coupled to an AC supply unit AC, which is adapted for inducing an electric current into the coil assembly 15 for generating said magnetic field.

The sensor 1 is mounted in the first refining disc 5 and comprises a measuring head 11', which is configured to be set in calibration position relative to the second refining disc 7 for calibration of the sensor device 1. The measuring head 11' forms a portion of a sleeve arrangement 14, in which the magnetic pole 13 is accommodated. The sleeve arrangement 14 includes an outer end 10', comprising non-magnetic material configured to abut the second grinding surface 6 of the second refining disc 7 for a calibration sequence. The non-magnetic material is thus configured to be positioned in abutment with the second refining disc for said calibration sequence.

The sensor 1 is coupled to a gap measurement converting circuitry 19, configured to convert variation of the magnetic field to electrical signals depending upon variation of the beating gap G between the measuring head 11' and the second grinding surface 6 of the second refining disc 7.

The first refining disc 5 is adapted to move in a direction 18 toward and from each other along the rotary axis X. The gap measurement converting circuitry 19 is coupled to a refining disc driver (not shown) configured to move at least the first refining disc 5 along the rotary axis X toward and/or from the second refining disc 7 for adjusting the beating gap G. The gap measurement converting circuitry 19 is furthermore coupled to a refining disc position sensor (not shown) for registration of the mutual position of the respective first 5 and second refining disc 7.

Alternatively, the gap measurement converting circuitry 19 is coupled to a control circuitry 130 configured to control the refining disc driver to move the first refining disc 5 and/or the second refining disc 7 along the rotary axis X.

An outer pole end 21 of the magnetic pole 13 is free from non-magnetic material and comprises magnetic material, which magnetic pole is encompassed in the sleeve arrangement 14 comprising the outer end 10' of non-magnetic material configured to abut the second grinding surface 6 of the second refining disc 7. The gap measurement converting circuitry 19 is configured to convert a first magnetic field value to a first electrical signal, which first magnetic field value correlates to a first distance value set between the first 4 and second grinding surface 6 and is configured to convert a second magnetic field value to a second electrical signal, which second magnetic field value correlates to a second distance value between the first 4 and second grinding surface 6.

Figure 2A:
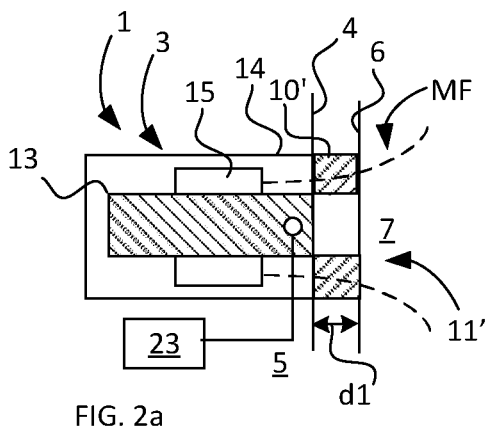
FIGS. 2a-2b illustrate a sensor device according to a second example.
Figure 2B:
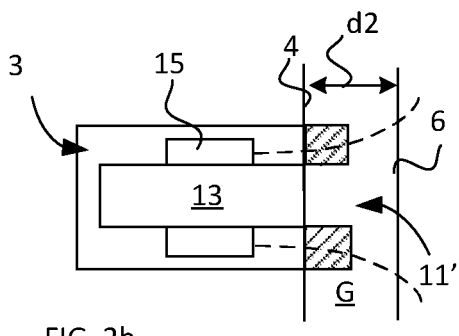

FIGS. 2*a*-2*b* illustrate a sensor 1 according to a second example. The sensor 1 comprises a transducer 3 adapted to generate a magnetic field MF. The sensor 1 is configured to measure a beating gap G (see FIG. 2*b* to FIG. 2*d*) between a first 5 and a second 7 refining disc. The sensor 1 comprises a magnetic pole 13, a coil assembly 15 and a measuring head 11" of the magnetic pole 13 configured to be set in calibration position relative to the second refining disc 7 for calibration of the sensor 1.

Figure 3A:
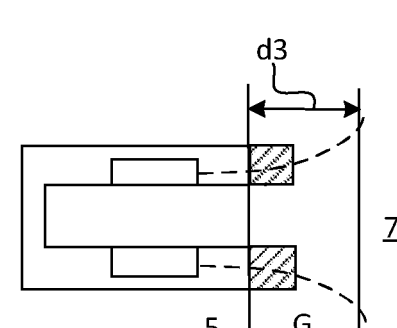
FIGS. 3*a*-3*b* illustrate a sensor device according to a third example.
Figure 3B:
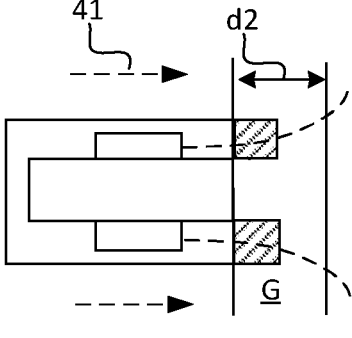

FIGS. 3*a*-3*b* illustrate the sensor 1 in FIGS. 2*a*-2*b* or according to a third example.

The sensor 1 is configured to measure a beating gap G (see FIG. 2*b* to FIG. 3*b*) between a first grinding surface 4 of a first refining disc 5 and a second grinding surface 6 of a second refining disc 7. The sensor 1 comprises a magnetic pole 13, a coil assembly 15 and a measuring head 11' of a sleeve arrangement 14 comprising an outer end 10' of non-magnetic material configured to abut the second grinding surface 6 for calibration of the sensor 1. The outer end 10' of the sleeve arrangement 14 is configured to be set in calibration position relative to the second refining disc 7 for calibration of the sensor 1. The outer end 10' is thus made of a non-magnetic material configured to be positioned in abutment with the second refining disc 7 in a calibration sequence.

The measuring head 11' is positioned in abutment with the second refining disc 7, as shown in FIG. 2*a*, and provides a first distance value d1 between the first grinding surface 4 and the second grinding surface 6. The first distance value d1 is registered by a measurement converting circuitry (not shown) of a control circuitry (not shown) as a calibration value.

The first distance value d1 is known as the distance that the non-magnetic outer end 10' of the sleeve arrangement 14 protrudes from and in a direction transverse to the first grinding surface 4. The first distance value d1 may be 0, 5 mm, or any other suitable distance.

In FIG. 2*b* is shown that the control circuitry has commanded motion of the first refining disc 5 along the rotary axis (not shown) in accordance with a second distance value d2 for reaching an efficient beating gap G distance value. The beating gap G distance value may be 5 mm, or any other suitable distance between the first grinding surface 4 and the second grinding surface 6. In case the first distance value d1 is 0, 5 mm, the second distance value d2 could be 4,5 mm for reaching an efficient beating gap distance value of 5 mm).

The beating gap G distance value naturally undergoes change (e.g. due to wear of the grinding surface) into a third distance value d3, as shown in FIG. 3*a*, different from the efficient beating gap distance value, whereas the sensor 1 register and convert the variation of the magnetic field MF of a third magnetic field value in compliance with said third distance value d3.

The gap measurement converting circuitry registers the third distance value d3 and the control circuitry activates a refining disc driver (not shown) to move the first and/or second refining disc 5, 7 toward each other for adjusting the third distance value d3 to reach the efficient beating gap G distance value, i.e. adjusting 41 the beating gap G to the second distance value d2, which is efficient for optimal grinding, as shown in FIG. 3b.

Figure 4A:
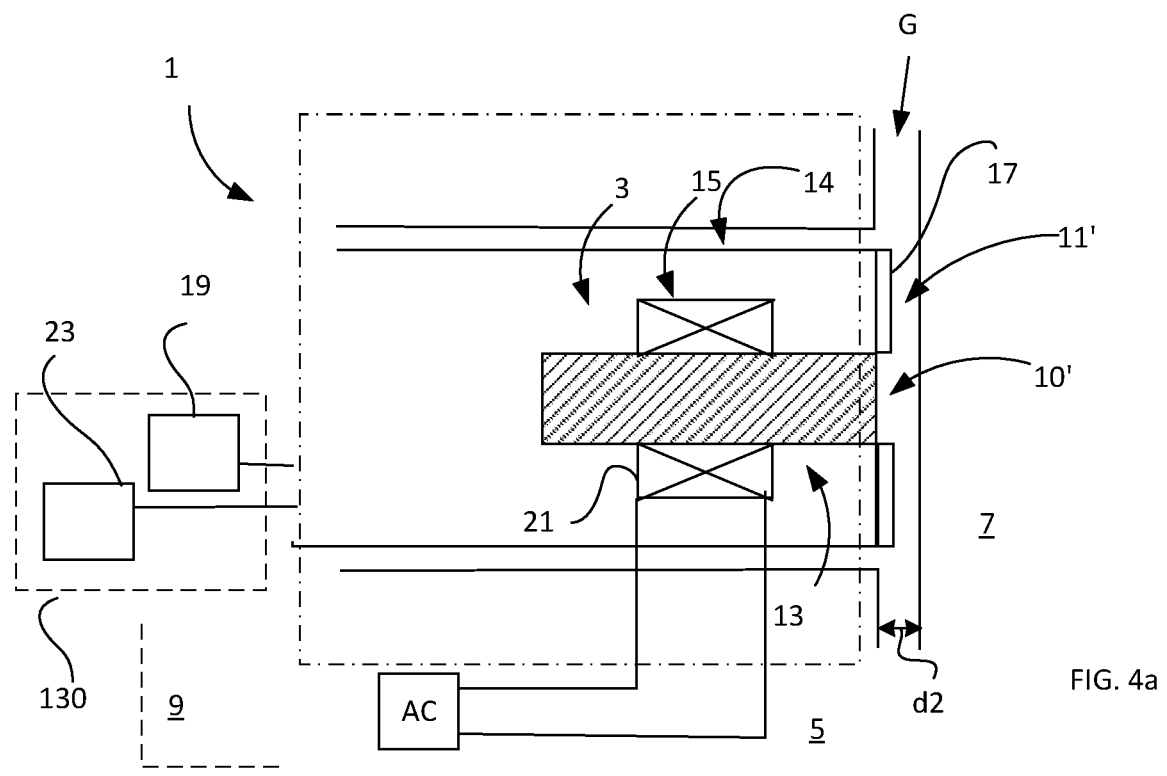
FIGS. 4*a*-4*b* illustrates a sensor device according to a fourth example.
Figure 4B:
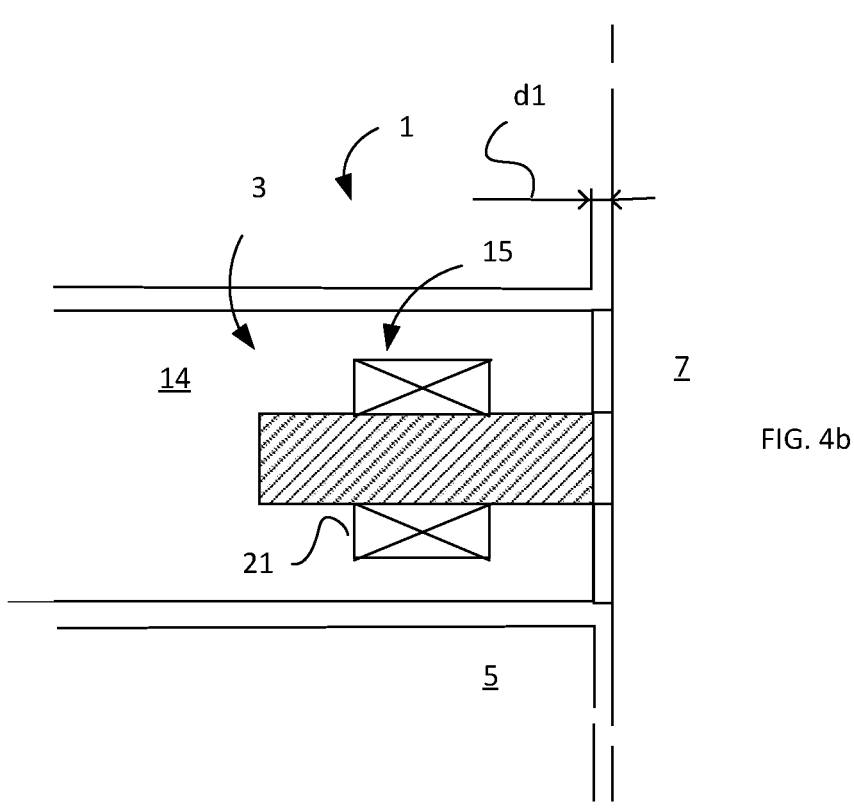

FIGS. 4a-4b illustrates a sensor 1 of a refiner apparatus 9 according to a fourth example. FIG. 4a shows the sensor comprising a transducer 3 coupled to an AC source and adapted to generate a magnetic field. The sensor 1 is configured to measure a beating gap G between a first refining disc 5 and a second refining disc 7. The sensor 1 comprises a magnetic pole 13, a coil assembly 15 and a measuring head 11' of a sleeve arrangement 14 comprising an outer end 10' of non-magnetic material configured to abut the second refining disc 7 for calibration of the sensor 1. The outer end 10' of the sleeve arrangement 14 is thus configured to be set in calibration position relative to the second refining disc 7 for calibration of the sensor 1.

The sensor device 1 may comprise a measuring head abutment detecting circuitry 23 configured to detect abutment of the measuring head 11' abutting the second refining disc 7, when moving the first and the second refining disc 5, 7 toward each other.

The non-magnetic outer end 10' may protrude from the first refining disc 5 with a known distance registered by a gap measurement converting circuitry 19 of a control circuit 130.

The measuring head abutment detecting circuitry 23 may be configured to detect mechanical vibrations and/or acoustic energy changes and/or temperature changes and/or current alternation of said induced electric current, related to said abutment shown in FIG. 4b.

Figures 5A, 5B, 6:
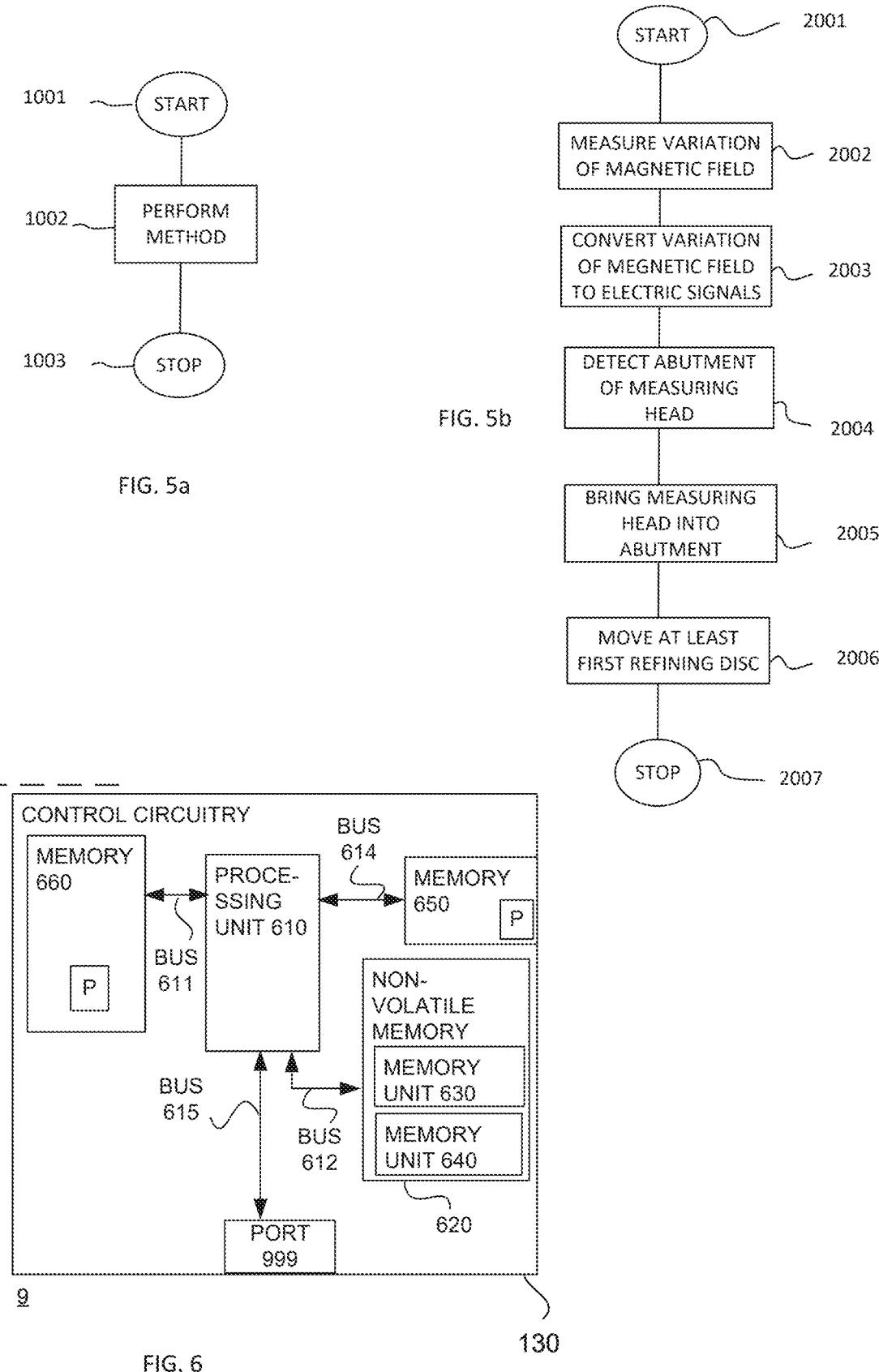
FIGS. 5*a*-5*b* illustrate flowcharts showing exemplary methods of calibration of a sensor device according to further examples.
FIG. 6 illustrates a control circuitry of an exemplary sensor device of a refiner apparatus.

FIG. 5a shows an exemplary method of calibration of a sensor device. The sensor device comprises a transducer adapted to generate a magnetic field. The sensor device is configured to measure a beating gap between a first and a second refining disc of a refiner apparatus and is configured to be mounted in the first refining disc. The sensor device comprises a magnetic pole, a coil assembly and a measuring head, which is configured to be set in calibration position relative to the second refining disc for calibration of the sensor device. The measuring head comprises an outer end made of a non-magnetic material configured to be positioned in abutment with the second refining disc in a calibration sequence.

The method comprises a first step 1001 starting the method. A second step 1002 shows the performance of the method. A third step 1003 comprises stopping of the method.

The second step 1002 may comprise; starting the calibration sequence; inducing an electric current into the coil assembly for generating the magnetic field around the magnetic pole; rotating the first and/or the second refiner disc about a rotary axis and moving them axially toward each other; and bringing the measuring head into abutment with the second refining disc for calibrating the sensor device.

FIG. 5b shows an exemplary method of calibration of a sensor device. A first step 2001 starting the method. A second step 2002 comprises measuring the variation of the magnetic field around the magnetic pole generated by the transducer. A third step 2003 comprises converting the variation of the magnetic field to electric signals depended upon variation of the distance between the measuring head and the second refining disc. A fourth step 2004 comprises the step of detecting abutment of the measuring head abutting the second refining disc and/or the second grinding surface. A fifth step 2005 comprises the step of bringing the measuring head into abutment with the second refining disc for calibrating the sensor device providing a first distance value between the first and second grinding surface, which first distance value is registered by the measurement converting circuitry. A sixth step 2006 comprises the step of: moving at least the first refining disc along the rotary axis in accordance with a second distance value for reaching an efficient beating gap value. A seventh step 2007 comprises stopping of the method.

FIG. 6 illustrates a control circuitry 130 of an exemplary sensor device 1 of a refiner apparatus 9. The control circuitry 130 is coupled to the sensor device 1. The control circuitry 130 is configured to control a refining disc driver of the refiner apparatus 9 to move the first and/or second refining disc along a rotary axis in accordance with a first distance value registered by a measurement converting circuitry of the sensor device 1 and subsequently in accordance with a second distance value.

The control circuitry 130 comprises a computer. The control circuitry 130 comprises a non-volatile memory NVM 620, which is a computer memory that can retain stored information even when the computer is not powered.

The control circuitry 130 further comprises a processing unit 610 and a read/write memory 650. The NVM 620 comprises a first memory unit 630. A computer program (which can be of any type suitable for any operational data) is stored in the first memory unit 630 for controlling the functionality of the control circuitry 130. Furthermore, the control circuitry 130 comprises a bus controller (not shown), a serial communication left (not shown) providing a physical interface, through which information transfers separately in two directions.

The control circuitry 130 may comprise any suitable type of I/O module (not shown) providing input/output signal transfer, an A/D converter (not shown) for converting continuously varying signals from the sensor device 1 and from the measuring head abutment detecting circuitry 23, into binary code suitable for the computer, and from other operational data.

Other operational data may be actual loads of the refiner discs, rotational rate of the refiner discs, temperatures of the grinding surfaces etc.

The control circuitry 130 also comprises an input/output unit (not shown) for adaptation to time and date. The control circuitry 130 comprises an event counter (not shown) for counting the number of event multiples that occur from independent events in operation of the refiner apparatus 9.

Furthermore, the control circuitry 130 includes interrupt units (not shown) associated with the computer for providing a multi-tasking performance and real time computing for automatically detection of the beating gap between the first and second grinding surface.

The NVM 620 also includes a second memory unit 640 for external sensor check of the sensor device 1.

A data medium storing program P may comprise program routines for automatically adapting the motion of the refiner discs along the rotary axis in accordance with detected beating gap and/or automatically calibration of the sensor device by means of the control circuitry 130.

The data medium storing program P comprises a program code stored on a medium, which is read-able on the computer, for causing the control circuitry 130 to perform the method of setting the measuring head in calibration position relative to the second refining disc 7 for calibration of the sensor device 1.

The data medium storing program P further may be stored in a separate memory 660 and/or in the read/write memory 650. The data medium storing program P, in this embodiment, is stored in executable or compressed data format.

It is to be understood that when the processing unit 610 is described to execute a specific function that involves that the processing unit 610 may execute a certain part of the program stored in the separate memory 660 or a certain part of the program stored in the read/write memory 650.

The processing unit 610 is associated with a data port 999 for communication via a first data bus 615. The non-volatile memory NVM 620 is adapted for communication with the processing unit 610 via a second data bus 612. The separate memory 660 is adapted for communication with the processing unit 610 via a third data bus 611. The read/write memory 650 is adapted to communicate with the processing unit 610 via a fourth data bus 614. The data port 999 is preferably connectable to data links of the sensor device 1. When data is received by the data port 999, the data will be stored temporary in the second memory unit 640.

After that the received data is temporary stored, the processing unit 610 will be ready to execute the program code, according to the above-mentioned method.

Preferably, the signals (received by the data port 999) comprise information about operational status of the sensor device 1. The signals may also comprise information regarding current and previous beating gap measurement and beating gap adjustments over time, etc.

The received signals at the data port 999 can be used by the control circuitry 130 for controlling and monitoring automatic calibration of the sensor device 1.

The information and data can be manually fed to the control unit via a suitable communication device, such as a computer display or a touchscreen.

The method can also partially be executed by the control circuitry 130 by means of the processing unit 610, which processing unit 610 runs the data medium storing program P being stored in the separate memory 660 or the read/write memory 650. When the control circuitry 130 runs the data medium storing program P, the suitable method steps disclosed herein will be executed.

The present invention is of course not in any way restricted to the preferred embodiments described above, but many possibilities to modifications, or combinations of the described embodiments thereof should be apparent to a person with ordinary skill in the art without departing from the basic idea of the invention as defined in the appended claims.

The invention claimed is:

1. A sensor device comprising a transducer, which is configured to generate a magnetic field, wherein the sensor device is configured to measure a beating gap between a first and a second refining disc of a refiner apparatus and is configured to be mounted in the first refining disc, wherein the sensor device comprises a magnetic pole, a coil assembly and a measuring head, which measuring head is configured to be set in a calibration position relative to the second refining disc for calibration of the sensor device, wherein the measuring head constitutes a portion of a sleeve arrangement in which the magnetic pole is accommodated, wherein the sleeve arrangement comprises the outer end comprising the non-magnetic material configured to abut the second refining disc for a calibration sequence, wherein a non-magnetic sleeve end of the sleeve arrangement forms a sleeve end surface facing a second grinding surface of the second refining disc, and wherein the non-magnetic sleeve end comprises stainless steel, and wherein the measuring head comprises an outer end made of a non-magnetic material configured to be positioned in abutment with the second refining disc in the calibration sequence.

2. The sensor device according to claim 1, wherein the sensor device is coupled to a gap measurement converting circuitry, configured to convert variation of the magnetic field to electrical signals depending upon variation of the beating gap between the measuring head and the second refining disc.

3. The sensor device according to claim 1, wherein the coil assembly is applied around the magnetic pole and is coupled to an AC supply unit configured to induce an electric current into the coil assembly for generating the magnetic field.

4. The sensor device according to claim 1, wherein a measuring head abutment detecting circuitry of the sensor device is configured to detect abutment of the measuring head abutting the second refining disc, when moving the first and the second refining disc toward each other.

5. The sensor device according to claim 4, wherein the measuring head abutment detecting circuitry is configured to detect mechanical vibrations and/or acoustic energy changes and/or temperature changes and/or current alternation of said induced electric current, related to said abutment.

6. A refiner apparatus comprising a sensor device according to claim 1, wherein the refiner apparatus further comprises a refining disc driver, a gap measurement converting circuitry and a control circuitry configured to control the refining disc driver to move the first and/or second refining disc along a rotary axis in accordance with a first distance value registered by the measurement converting circuitry and subsequently in accordance with a second distance value.

7. A non-transitory data storage medium storing program configured to calibrate the sensor device of the refiner apparatus according to claim 6, wherein said data medium storing program comprises a program code stored on a medium, which is readable on a computer, for causing the control circuitry to perform the method steps of:

starting the calibration sequence;

inducing an electric current into the coil assembly to generate the magnetic field around the magnetic pole;

rotating the first and/or the second refiner disc about a rotary axis and moving them axially toward each other; and bringing the measuring head into abutment with the second refining disc for calibrating the sensor device.

8. A method of calibration of a sensor device comprising a transducer, which is configured to generate a magnetic field, wherein the sensor device is configured to measure a beating gap between a first and a second refining disc of a refiner apparatus and is configured to be mounted in the first refining disc, wherein the sensor device comprises a magnetic pole, a coil assembly and a measuring head, which measuring head is configured to be set in a calibration position relative to the second refining disc for calibration of the sensor device in a calibration sequence, wherein the measuring head constitutes a portion of a sleeve arrangement in which the magnetic pole is accommodated, wherein the sleeve arrangement comprises the outer end comprising the non-magnetic material configured to abut the second refining disc for the calibration sequence, wherein a non-magnetic sleeve end of the sleeve arrangement forms a sleeve end surface facing a second grinding surface of the second refining disc, and wherein the non-magnetic sleeve end comprises stainless steel, and wherein the measuring head comprises an outer end made of a non-magnetic material configured to be positioned in abutment with the second refining disc in the calibration sequence, the method comprising:

starting the calibration sequence;

inducing an electric current into the coil assembly to generate a magnetic field around the magnetic pole for the calibration sequence;

rotating the first and/or the second refiner disc about a rotary axis and moving them axially toward each other; and bringing the measuring head into abutment with the second refining disc for calibrating the sensor device.

9. The method according to claim 8, further comprising:

measuring a variation of the magnetic field around the magnetic pole generated by the transducer; and converting the variation of the magnetic field to electric signals depending upon variation of a distance between the measuring head and the second refining disc.

10. The method according to claim 8, further comprising:

detecting abutment of the measuring head abutting the second refining disc and/or the second grinding surface.

11. The method according to claim 8, wherein the step of bringing the measuring head into abutment with the second refining disc for calibrating the sensor device provides a first distance value between the first and second grinding surface, which first distance value is registered by the measurement converting circuitry.

12. The method according to claim 11, further comprising:

moving at least the first refining disc along the rotary axis in accordance with a second distance value for reaching a beating gap value.

13. A non-transitory data storage medium storing program product comprising a program code stored on a medium, which is readable on a computer, for performing the method steps according to claim 8, when a data medium storing program is run on the control circuitry.

\* \* \* \* \*